United States Patent
Dixon et al.

(10) Patent No.: US 10,427,883 B2
(45) Date of Patent: Oct. 1, 2019

(54) MULTI-DRIVE CONVEYOR SYSTEMS AND METHODS OF USING SAME

(71) Applicant: FEDEX CORPORATION, Memphis, TN (US)

(72) Inventors: Randy Dixon, Hernando, MS (US); C. Todd McDaniel, Memphis, TN (US)

(73) Assignee: FEDEX CORPORATION, Memphis, TN (US)

( * ) Notice: Subject to any disclaimer, the term of this patent is extended or adjusted under 35 U.S.C. 154(b) by 0 days.

(21) Appl. No.: 15/890,543

(22) Filed: Feb. 7, 2018

(65) Prior Publication Data

US 2018/0222682 A1     Aug. 9, 2018

Related U.S. Application Data

(60) Provisional application No. 62/455,826, filed on Feb. 7, 2017.

(51) Int. Cl.
  *B65G 23/44* (2006.01)
  *B65G 15/28* (2006.01)
  *B65G 21/10* (2006.01)
  *B65G 23/10* (2006.01)

(52) U.S. Cl.
  CPC .............. *B65G 23/44* (2013.01); *B65G 15/28* (2013.01); *B65G 21/10* (2013.01); *B65G 23/10* (2013.01); *B65G 2207/30* (2013.01); *B65G 2812/02148* (2013.01); *B65G 2812/02217* (2013.01)

(58) Field of Classification Search
  CPC ........ B65G 23/00; B65G 23/02; B65G 23/04; B65G 23/06; B65G 23/10; B65G 23/12; B65G 23/44; B65G 21/10; B65G 15/28
  USPC .............................. 198/832–835, 615, 860.2
  See application file for complete search history.

(56) References Cited

U.S. PATENT DOCUMENTS

| | | | | |
|---|---|---|---|---|
| 2,074,595 A | * | 3/1937 | Shackelford | B65G 23/00 198/816 |
| 2,452,980 A | * | 11/1948 | Beltz | B65G 23/44 198/813 |
| 5,265,714 A | * | 11/1993 | Hansen | B65G 23/22 198/813 |

(Continued)

OTHER PUBLICATIONS

International Search Report and Written Opinion dated Jun. 11, 2018 by the international Searching Authority for Patent Application No. PCT/US2018/017184, which was filed on Feb. 7, 2018 (Inventor—Dixon et al.; Applicant—FedEx Corporation; (12 pages).

*Primary Examiner* — William R Harp
(74) *Attorney, Agent, or Firm* — Ballard Spahr LLP

(57) ABSTRACT

Disclosed is a conveyor system and method for advancing an item relative to a transport axis. The conveyor system includes a conveyor belt and a modular drive assembly having at least one drive module and at least one take-up module. Each drive module and each take-up module has a housing and a pulley assembly positioned within the housing. The respective positions of the housings of the at least one drive module and the at least one take-up module relative to the transport axis are selectively adjustable to modify the conveyor movement pathway. Moreover, the drive module can also include a drive pulley removal apparatus that is detachably secured within the housing for selective removal and replacement of a drive pulley.

18 Claims, 10 Drawing Sheets

(56) References Cited

U.S. PATENT DOCUMENTS

| | | | | |
|---|---|---|---|---|
| 5,641,056 | A | * | 6/1997 | Lem ........................ B65G 15/42 198/699.1 |
| 6,427,831 | B1 | * | 8/2002 | Norton ................... B65G 21/06 198/841 |
| 6,520,321 | B2 | * | 2/2003 | Thurston ................ B65G 21/06 198/813 |
| 6,910,571 | B1 | * | 6/2005 | Ertel .................... B65G 21/105 193/35 R |
| 6,971,509 | B2 | * | 12/2005 | Ertel ..................... B65G 21/06 198/813 |
| 7,380,654 | B2 | * | 6/2008 | Barry ...................... B25J 18/04 198/834 |
| 2011/0315514 | A1 | | 12/2011 | Lim et al. |
| 2013/0199900 | A1 | | 8/2013 | Lim et al. |
| 2015/0232282 | A1 | | 8/2015 | Eagleson et al. |
| 2016/0347548 | A1 | | 12/2016 | Yamaji |

\* cited by examiner

MULTI-DRIVE CONVEYOR SYSTEMS AND METHODS OF USING SAME

CROSS-REFERENCE TO RELATED APPLICATION

This application claims priority to and the benefit of the filing date of U.S. Provisional Patent Application No. 62/455,826, filed Feb. 7, 2017, which is incorporated herein by reference in its entirety.

FIELD

The disclosed invention relates to conveyor systems that can be used on bulk flow belt conveyors and, more particularly, to conveyor systems having modular drive assemblies that can be selectively adjustable to modify the conveyor movement pathway.

BACKGROUND

Current belt conveyors are typically bulky, fixed assemblies that are customized for particular end applications. Modification of such conveyors or replacement of conveyor components typically requires substantial or complete dismantling of the conveyor assembly. For example, installation and removing of motorized drive components requires "breaking" the conveyor belt, and a change in the overall movement pathway of the conveyor can only be accomplished by dismantling the entire conveyor assembly. Thus, any installation or maintenance activity can result in significant operational downtime. Additionally, drive components (e.g., motors, reducers, and belts) of current belt conveyor systems are separately and permanently installed and can only be adjusted or replaced by a maintenance worker positioned within the support structure of the conveyor. To accomplish the adjustments and replacements, maintenance workers typically must position themselves inside the support structure with potentially rotating equipment in order to gain sufficient access to the portions of the system that require attention. Such conditions can lead to injuries to the maintenance workers.

Thus, there is a need for conveyor systems and methods that address one or more of the deficiencies of existing conveyor systems. For example, there is a need for conveyor systems that can provide flexible conveyor configurations and/or simplify (and improve the safety of) the installation and removal of drive components.

SUMMARY

Described herein, in various aspects, is a conveyor system for advancing an item relative to a transport axis. The conveyor system can include a conveyor belt and a modular drive assembly. The modular drive assembly can include at least one drive module and at least one take-up module. Each drive module can include a housing and a pulley assembly that can be positioned within the housing. The pulley assembly of each drive module can be configured to engage the conveyor belt and drive movement of the conveyor belt along a conveyor movement pathway. Each take-up module can include a housing and a pulley assembly that can be positioned within the housing. The pulley assembly of each take-up module can be configured to engage the conveyor belt and provide tension to the conveyor belt as the conveyor belt moves along the conveyor movement pathway. The respective positions of the housings of the at least one drive module and the at least one take-up module relative to the transport axis can be selectively adjustable to modify the conveyor movement pathway.

Also described herein is a drive module for a conveyor system. The drive module can include a housing, a pulley assembly, and a drive pulley removal apparatus. The pulley assembly can be positioned within the housing and include a motorized drive pulley. The motorized drive pulley can have at least one mounting bracket for detachably securing the motorized drive pulley to the housing. The motorized drive pulley of each drive module can be selectively removable and replaceable. The drive pulley removal apparatus can be detachably secured within the housing. Following detachment of the motorized drive pulley from the housing, the drive pulley removal apparatus can be configured to engage the at least one mounting bracket of the motorized drive pulley and effect movement of the motorized drive pulley from a stowed position within the housing of the drive module to an accessible position in which at least a portion of the motorized drive pulley can be outside the housing of the drive module.

Further described herein is a method of driving a conveyor to advance an item relative to a transport axis. The method can include selectively positioning a conveyor drive assembly in a first configuration to define a first conveyor movement pathway. The conveyor drive assembly can include a plurality of modules. Each module of the conveyor drive assembly can have a housing and a pulley assembly that can be positioned within the housing. The housings of the plurality of modules can be selectively positioned relative to the transport axis to define the first conveyor movement pathway. The method can also include positioning a first item on a conveyor belt positioned in engagement with the pulley assembly of each module of the conveyor drive assembly. The method can also include driving movement of the conveyor belt relative to the first conveyor movement pathway. The method can further include disengaging the conveyor belt from the pulley assembly of at least one module of the conveyor drive assembly. The method can include selectively adjusting the positioning of the housing of at least one module of the conveyor drive assembly to define a second conveyor movement pathway that is different from the first conveyor movement pathway. The method can also include positioning the conveyor belt in engagement with the pulley assemblies of the plurality of modules of the conveyor drive assembly. The method can further include positioning a second item on the conveyor belt. The method can include driving movement of the conveyor belt relative to the second conveyor movement pathway.

Still further described herein is a method of driving a conveyor to advance an item relative to a transport axis. The method can include selectively positioning a conveyor drive assembly in a first configuration to define a first conveyor movement pathway. The conveyor drive assembly can include a plurality of modules. Each module of the conveyor drive assembly can have a housing and a pulley assembly that can be positioned within the housing. The plurality of modules can include a drive module. The pulley assembly of the drive module can include a motorized drive pulley. The housings of the plurality of modules can be selectively positioned relative to the transport axis to define the first conveyor movement pathway. The method can also include positioning a conveyor belt in engagement with the pulley assemblies of the plurality of modules of the conveyor drive assembly such that the conveyor belt forms a closed loop. The method can further include selectively removing and replacing the motorized drive pulley of the drive module without breaking the closed loop formed by the conveyor belt.

DESCRIPTION OF THE DRAWINGS

FIGS. 9A-9B also depict a drive pulley removal apparatus positioned in engagement with a drive pulley as disclosed herein. As shown, the drive pulley removal apparatus can be mounted to the drive module in a variety of positions to ensure that the drive pulley removal apparatus can achieve a vertical orientation to permit removal of the drive pulley, regardless of the orientation of the drive module.

DETAILED DESCRIPTION

Figure 1:
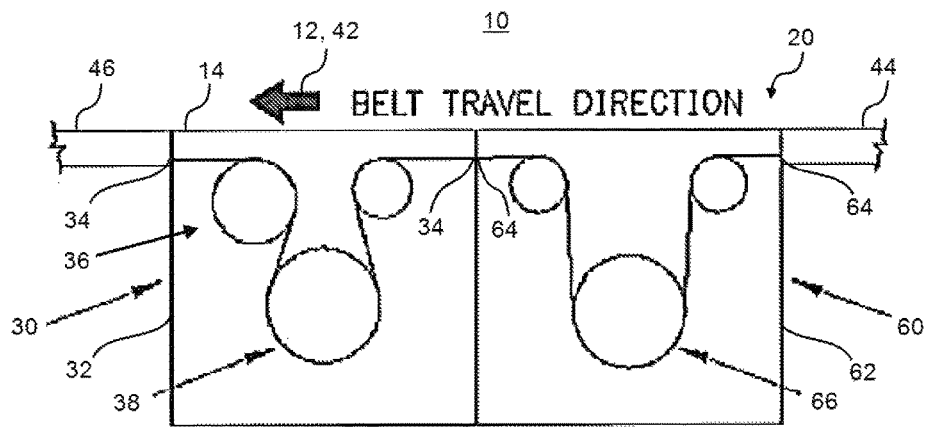
FIG. 1 is a schematic diagram of an exemplary configuration of a conveyor system for advancing an item relative to a transport axis as disclosed herein.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a", "an", and "the" include plural referents unless the context clearly dictates otherwise. For example, use of the term "a drive module" can refer to one or more of such drive modules unless the context indicates otherwise.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

As used herein, the term "substantially," when used to describe an angular orientation, refers to an angular orientation that is within up to 15 degrees (optionally, within 10 degrees, or within 5 degrees) in either direction (positive or negative) of a referenced angular orientation. For example, if a component is provided "substantially parallel" to a reference surface, then the component can positioned at an angular orientation that is within up to 15 degrees (optionally, within 10 degrees, or within 5 degrees) of the angular orientation of the reference surface.

The following description supplies specific details in order to provide a thorough understanding. Nevertheless, the skilled artisan would understand that the apparatus and associated methods of using the apparatus can be implemented and used without employing these specific details. Indeed, the apparatus, systems, and associated methods can be placed into practice by modifying the illustrated apparatus, systems, and associated methods and can be used in conjunction with any other apparatus, systems, and techniques conventionally used in the industry.

Disclosed herein, and with reference to FIGS. 1-9B, are conveyor systems and methods of driving a conveyor to advance an item relative to a transport axis 12. In exemplary aspects, a conveyor drive assembly 20 can be selectively positioned in a first configuration to define a first conveyor movement pathway. As used herein, the term "conveyor movement pathway" refers to the overall shape, pattern, and direction of a conveyor belt passing through a conveyor system as disclosed herein. Optionally, the conveyor drive assembly 20 can comprise a plurality of modules, and each module of the conveyor drive assembly can have a housing and a pulley assembly positioned within the housing. It is contemplated that the housings of the plurality of modules can be selectively positioned relative to the transport axis 12 to define the first conveyor movement pathway. It is further contemplated that an item placed on a conveyor belt 14 engaged with the conveyor drive assembly 20 can move relative to the first conveyor movement pathway. Optionally, it is further contemplated that the positioning of the housing of the at least one module of the conveyor drive assembly 20 can be selectively adjusted to define a second conveyor movement pathway that is different from the first conveyor movement pathway such that an item positioned on the conveyor belt 14 can move relative to the second conveyor movement pathway. It is contemplated that the second conveyor movement pathway can differ from the first conveyor movement pathway in shape, pattern, direction, or combinations thereof. Non-limiting examples of suitable conveyor movement pathways are depicted in FIGS. 1-4.

Further disclosed herein, in various aspects and with reference to FIGS. 1-7, are conveyor systems 10 for advancing an item relative to a transport axis 12. In various exemplary aspects, a conveyor system 10 can comprise a conveyor belt 14 and a conveyor drive assembly 20, which, as further disclosed herein, can be a modular drive assembly. In these exemplary aspects, the modular drive assembly 20 can comprise at least one drive module 30 and at least one take-up module 60. Optionally, in some aspects, the disclosed drive assembly 20 can be non-reversing (i.e., configured to move in a single direction along a conveyor movement pathway). However, in other alternative aspects, it is contemplated that the drive assembly 20 can be configured to be reversing (i.e., capable of changing its direction of movement along a conveyor movement pathway). In further aspects, each drive module 30 can include a housing 32 and a pulley assembly 36 that can be positioned within the housing 32. In these aspects, each pulley assembly 36 can comprise a drive pulley 38 as further disclosed herein. It is contemplated that each pulley assembly 36 can further comprise at least one idler pulley (e.g., at least one "bend" pulley), such as, for example and without limitation, first and second idler pulleys 39a, 39b positioned on opposing sides of the drive pulley 38 relative to the transport axis 12. In exemplary aspects and with reference to FIGS. 5A-7 and 9A-9B, it is contemplated that the pulley assembly 36 of each drive module 30 can comprise a motorized drive pulley 38. It is contemplated that the motorized drive pulley 38 can comprise, for example and without limitation, at least one drum motor.

Optionally, in further exemplary aspects, the components of the pulley assembly 36 of each drive module 30 can be selectively rearranged or replaced to accommodate various sizes of pulley assemblies and pulley assembly components. It is contemplated that at least a portion of the pulley assembly 36 can be rearranged or replaced to accommodate various changes, such as changes in horsepower or speed. In these aspects, at least a portion of the components of the pulley assembly 36 of each drive module 30 can be detachably secured within the housing 32 of the drive module 30. In use, it is contemplated that at least one pulley (e.g., a drive pulley or idler pulley) of a pulley assembly 36 of a drive module 30 can be selectively removed and replaced by a second pulley having a different size or different position than the pulley it is replacing. In exemplary aspects, it is contemplated that the drive pulley 38 of at least one of the pulley assemblies 36 can be selectively removed and replaced by a second drive pulley to provide an adjustment in speed or horsepower.

In another aspect, the pulley assembly 36 of each drive module 30 can be configured to engage the conveyor belt 14 and drive movement of the conveyor belt 14 along a conveyor movement pathway 42. In still further aspects, each take-up module 60 can include a housing 62 and a pulley assembly 66 that can be positioned within the housing 62. In another aspect, the pulley assembly 66 of each take-up module 60 can be configured to engage the conveyor belt 14 and provide tension to the conveyor belt as the conveyor belt moves along the conveyor movement pathway 42. In these aspects, the respective positions of the housings 32, 62 of the at least one drive module 30 and the at least one take-up module 60 relative to the transport axis 12 can be selectively adjustable to modify the conveyor movement pathway 42.

For example and without limitation, it is contemplated that the disclosed conveyor systems 10 can be used on belt conveyors in either flat or incline/decline applications of up to about 15 degrees. In exemplary aspects, the conveyor belt 14 can be oriented parallel or within about 1 degree (positive or negative) of parallel to a horizontal surface, such as a floor, to achieve a flat configuration. In further exemplary aspects, at least a portion of the conveyor belt 14 can be oriented at an incline ranging from about 0 degrees to about 15 degrees, from about 0 degrees to about 5 degrees, from about 5 degrees to about 10 degrees, or from about 10 degrees to about 15 degrees relative the horizontal surface. Thus, in inclined configurations, it is contemplated that at least a portion of the conveyor belt 14 can be oriented at an incline of about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, or about 15 degrees relative to the horizontal surface. In further exemplary aspects, at least a portion of the conveyor belt 14 can be oriented at a decline ranging from about 0 degrees to about 15 degrees, from about 0 degrees to about 5 degrees, from about 5 degrees to about 10 degrees, or from about 10 degrees to about 15 degrees relative the horizontal surface. Thus, in declined configurations, it is contemplated that at least a portion of the conveyor belt 14 can be oriented at an decline of about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, or about 15 degrees relative to the horizontal surface. Optionally, in exemplary aspects, it is contemplated that the conveyor movement pathway 42 can include a flat or horizontal portion and an inclined or declined portion. In still further optional aspects, it is contemplated that the conveyor movement pathway 42 can include a flat or horizontal portion, an inclined portion, and a declined portion.

In exemplary non-limiting aspects, in order to achieve a desired configuration of the conveyor belt 14, it is contemplated that at least a portion of the modular drive assembly 20 can be selectively positioned in a flat orientation, an inclined orientation, a declined orientation, or combinations thereof. In these aspects, it is contemplated that the housing of each module 30, 60, 70, 80 of the entire modular drive assembly 20 can be selectively positioned (e.g., mounted) in an orientation needed to achieve a selected conveyor movement pathway as disclosed herein. Thus, it is contemplated that the orientation of selected modules of the modular drive assembly 20 themselves (rather than only portions of the conveyor belt) can be adjusted to achieve a desired pattern of the conveyor belt. In exemplary aspects, it is contemplated that at least one module of the modular drive assembly 20 can be positioned in an inclined orientation. When a take-up module is positioned in an inclined position, it is contemplated that an adjacent drive module can also be positioned in an inclined position to continue the inclined path of the conveyor belt. Similarly, when a take-up module is positioned in a declined position, it is contemplated that an adjacent drive module can also be positioned in a declined position to continue the declined path of the conveyor belt. In further exemplary aspects, it is contemplated that each module (take-up module 60, drive module 30, terminal module 70, upturn module 80) can be mounted in a desired orientation relative to the transport axis 12, such as, for example, an inclined orientation, a horizontal/flat orientation, or a declined orientation.

Figure 8A:
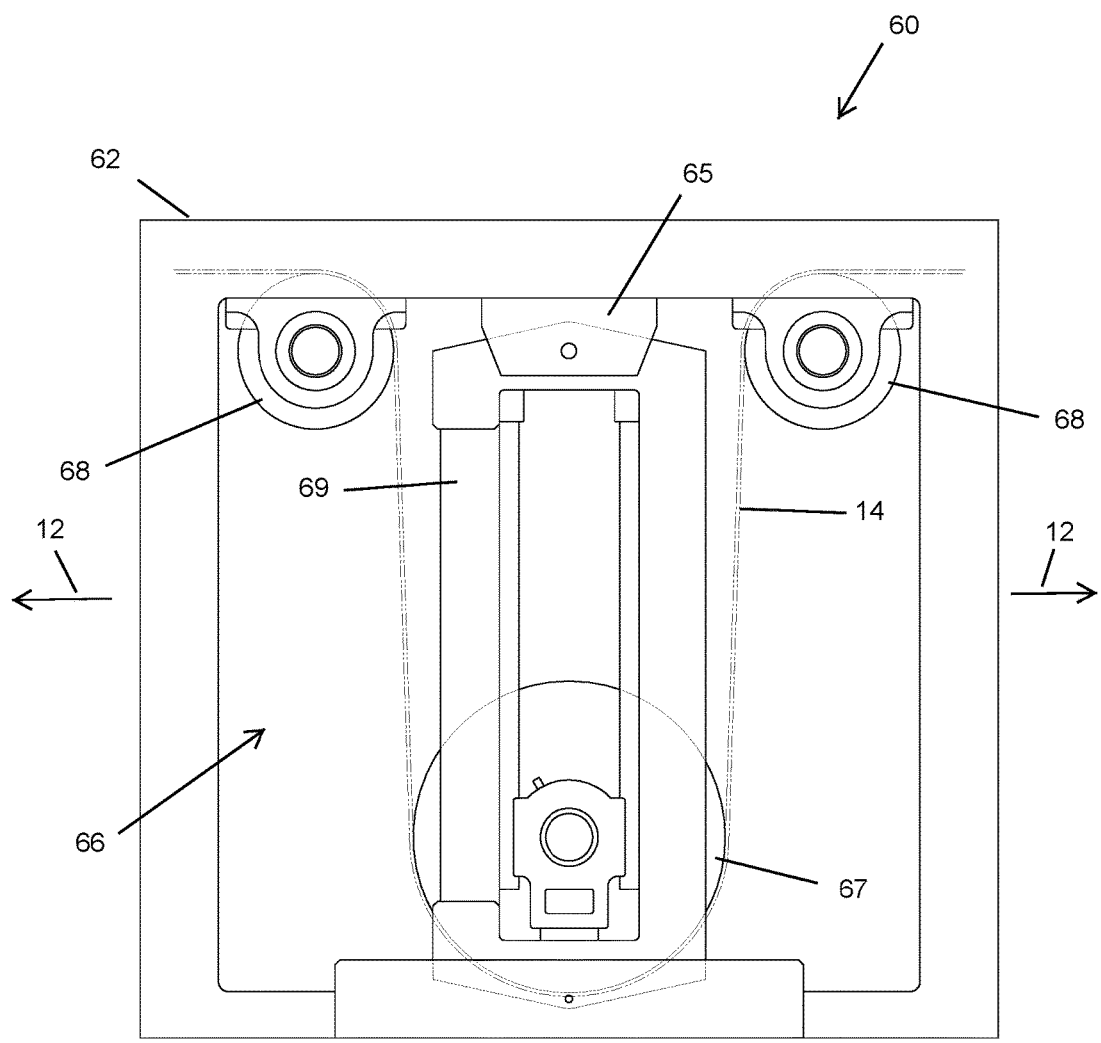
FIG. 8A is a partially transparent side view of an exemplary take-up module that is positioned in a horizontal orientation.
Figure 8B:
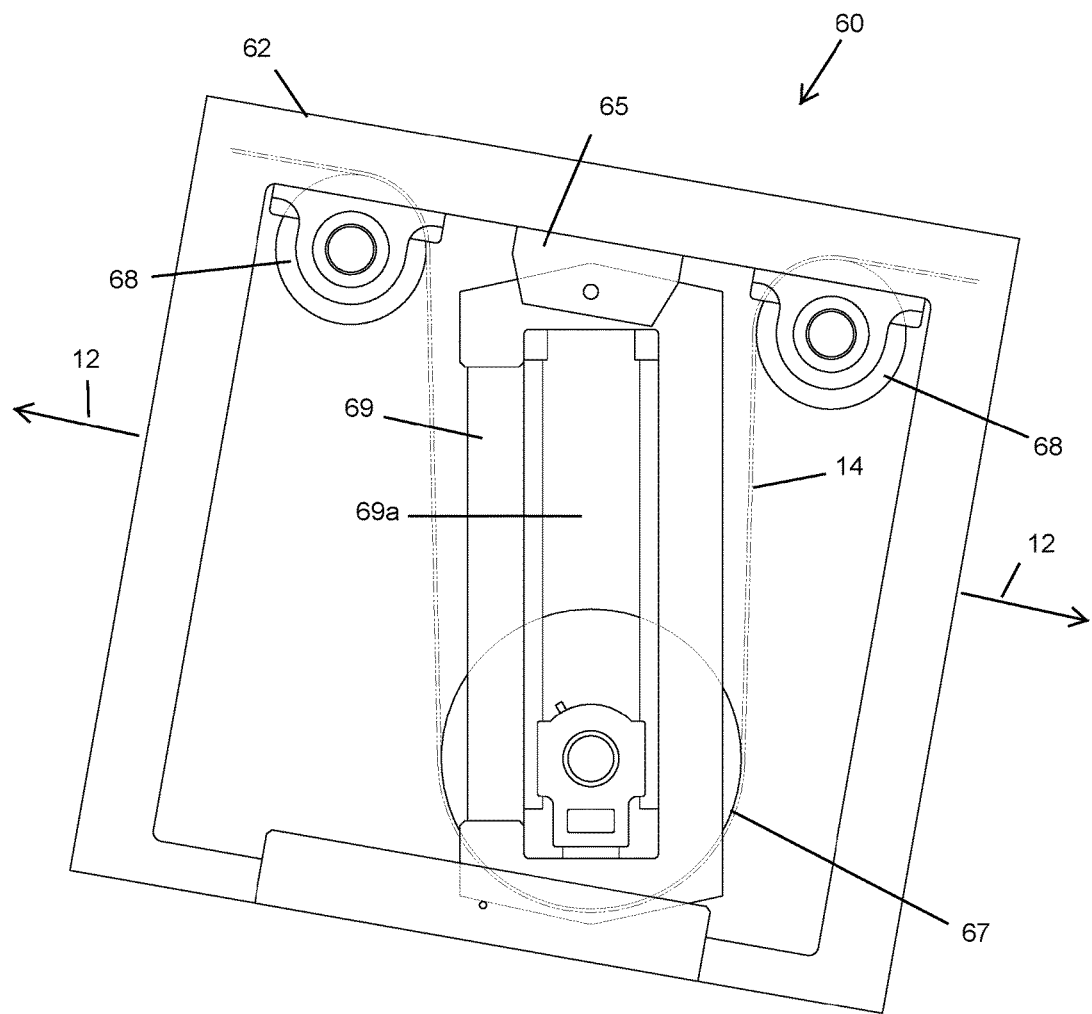
FIG. 8B is a partially transparent side view of the take-up module of FIG. 8A, with the take-up module positioned in a tilted orientation (angled relative to a horizontal axis) as disclosed herein. As shown, in either orientation of the take-up module, the weighted, gravity-based center take-up pulley remains in a vertical orientation.

An exemplary modification of the angular orientation of a take-up module 60 is depicted in FIGS. 8A-8B. As shown, the pulley assembly 66 can comprise a center, gravity-based weighted pulley 67 and at least one idler pulley (e.g., at least one "bend" pulley), such as, for example and without limitation, first and second idler pulleys 68 positioned on opposing sides of the center pulley 67 relative to the transport axis 12. Optionally, the idler pulleys 68 of the pulley assembly 66 can be mounted to an upper portion of the housing 62. In exemplary aspects, the center pulley 67 can be coupled (e.g. secured) to a pair of guide arm assemblies 69 that are pivotally coupled to the upper portion of housing 62 at brackets/fulcrums 65. Optionally, in these aspects, the guide arm assemblies 69 can have respective longitudinal axes and define respective center openings 69a that extend along the longitudinal axes and permit selective adjustment of the position of the center pulley 67 relative to the longitudinal axes of the guide arm assemblies 69 (e.g., with portions of the center pulley being configured for selective engagement with the guide arm assembly using conventional fasteners or mounting devices). As shown in FIG. 8A, when the take-up module 60 is in a flat or horizontal orientation, the guide arm assemblies 69 can be positioned in a perpendicular or substantially perpendicular orientation (i.e., vertical or substantially vertical orientation) relative to the transport axis 12. When the take-up module 60 is in an inclined orientation (shown in FIG. 8B) or a declined orientation, the guide arm assemblies 69 (and, thus, the center pulley 67) can be configured to pivot relative to brackets/fulcrums 65 to maintain a vertical or substantially vertical orientation, which, in the inclined or declined orientation, is angularly oriented relative to the transport axis 12 (and the orientation of the conveyor belt 14). Thus, as the guide arm assemblies 69 pivot, the center-to-center distances between the center pulley 67 and the idler pulleys 68 can vary (increase or decrease), depending on the direction of pivotal movement.

Figure 9A:
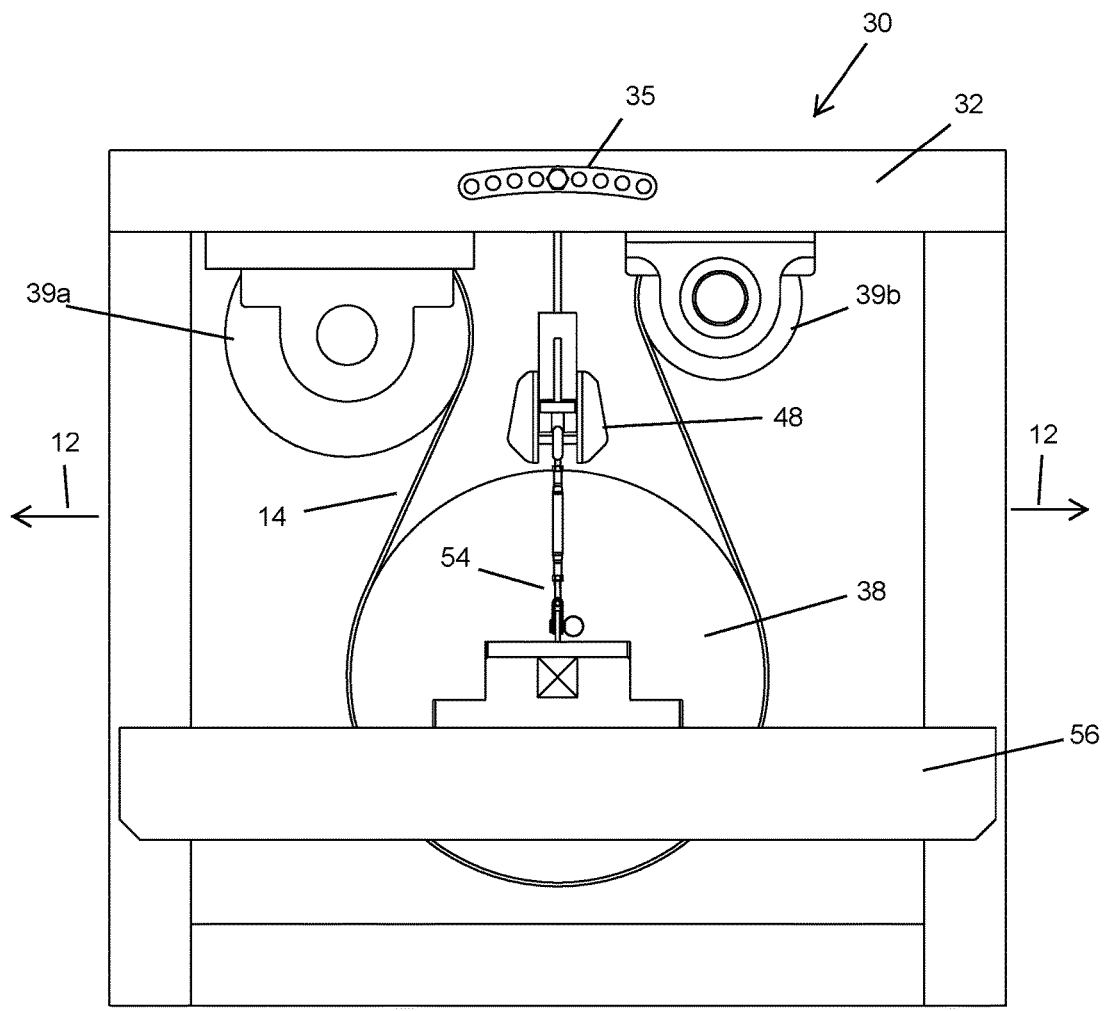
FIG. 9A is a side view of an exemplary drive module that is positioned in a horizontal orientation.
Figure 9B:
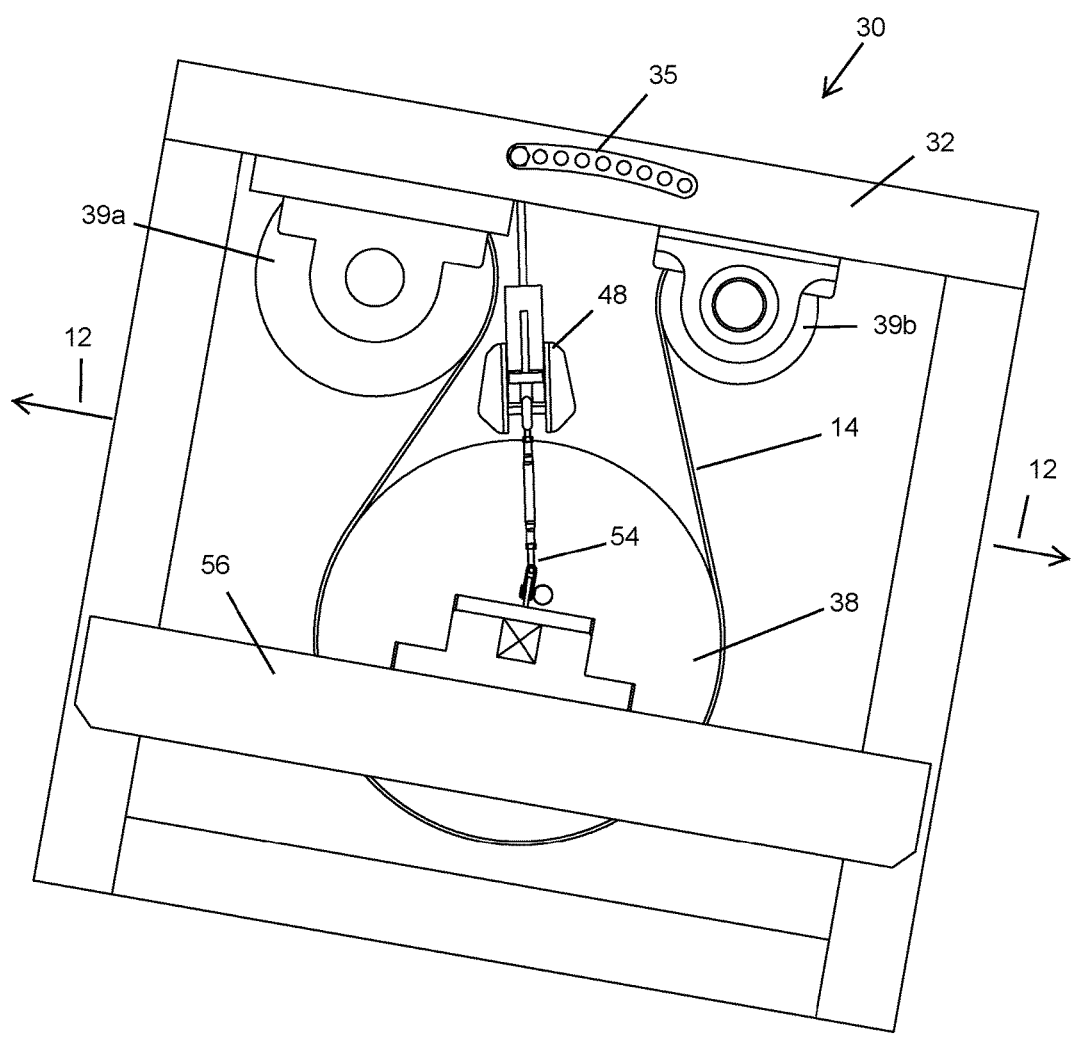
FIG. 9B is a side view of the drive module of FIG. 9A, with the drive module positioned in a tilted orientation (angled relative to a horizontal axis) as disclosed herein.

An exemplary modification of the angular orientation of a drive module 30 is depicted in FIGS. 9A-9B. In exemplary aspects, the first and second idler pulleys 39a, 39b of the pulley assembly 36 can be mounted to an upper portion of the housing 32. Optionally, in these aspects, the first idler pulley 39a can be larger than the second idler pulley 39b. As shown in FIGS. 5A-6C and 9A-9B, the drive module 30 can comprise a side support frame 56 that extends horizontally across the module and is configured to support the drive pulley 38 in a central (or other desired) position relative to the transport axis 12. It is contemplated that the side support frame 56 can be selectively replaced depending on the particular size of a particular drive module 30 or drive pulley 38. In order to modify the angular orientation of the conveyor belt 14 through the drive module 30, the housing 32 of the drive module can be mounted at a selected incline or decline. However, unlike the take-up module, the inner components of the drive module 30 do not pivot relative to the housing 32, and the relative positions of the pulleys 38, 39a, 39b within the drive module, and the orientations of the pulleys with respect to the conveyor belt 14 and the transport axis, remain unchanged, regardless of the angular orientation of the drive module.

In exemplary aspects, the at least one drive module 30 can comprise a single drive module. Optionally, however, it is contemplated that the at least one drive module 30 can comprise a plurality of drive modules. In further aspects, the at least one take-up module 60 can comprise a single take-up module. Alternatively, in optional aspects, it is contemplated that the at least one take-up module 60 can comprise a plurality of take-up modules. In one exemplary aspect, it is contemplated that the at least one drive module 30 can comprise a single drive module and that the at least one take-up module 60 can comprise a single take-up module. In another exemplary aspect, it is contemplated that the at least one drive module 30 can comprise a plurality of drive modules and that the at least one take-up module 60 can comprise a plurality of take-up modules.

In exemplary aspects, the housing 32 of a first drive module 30 of the at least one drive module 30 can be positioned adjacent the housing 62 of a first take-up module 60 of the at least one take-up module 60. In further exemplary aspects, the housings 32, 62 of the first drive module 30 and the first take-up module 60 can define respective openings 34, 64 that receive portions of the conveyor belt 14 that extend between the pulley assembly 36 of the first drive module 30 and the pulley assembly 66 of the first take-up module 60.

Figure 2:
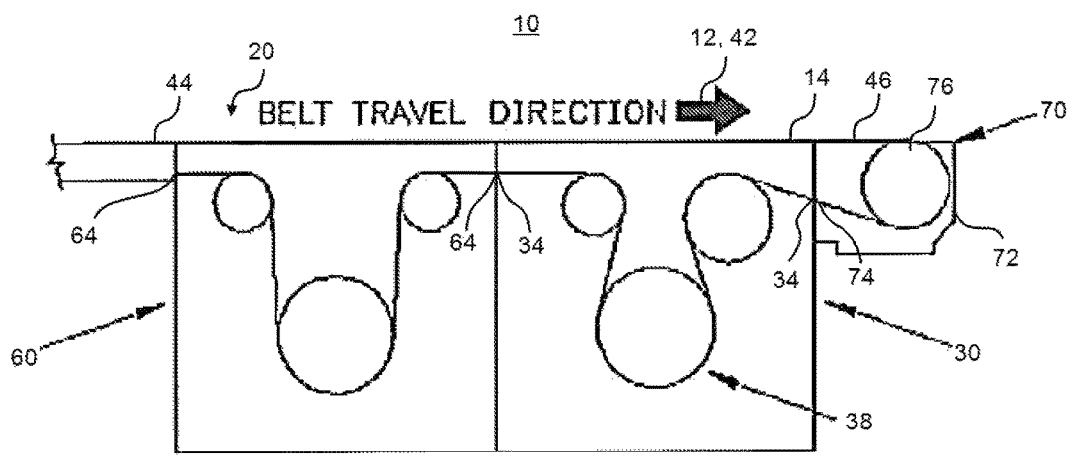
FIG. 2 is a schematic diagram of another exemplary configuration of a conveyor system for advancing an item relative to a transport axis as disclosed herein.
Figure 3:
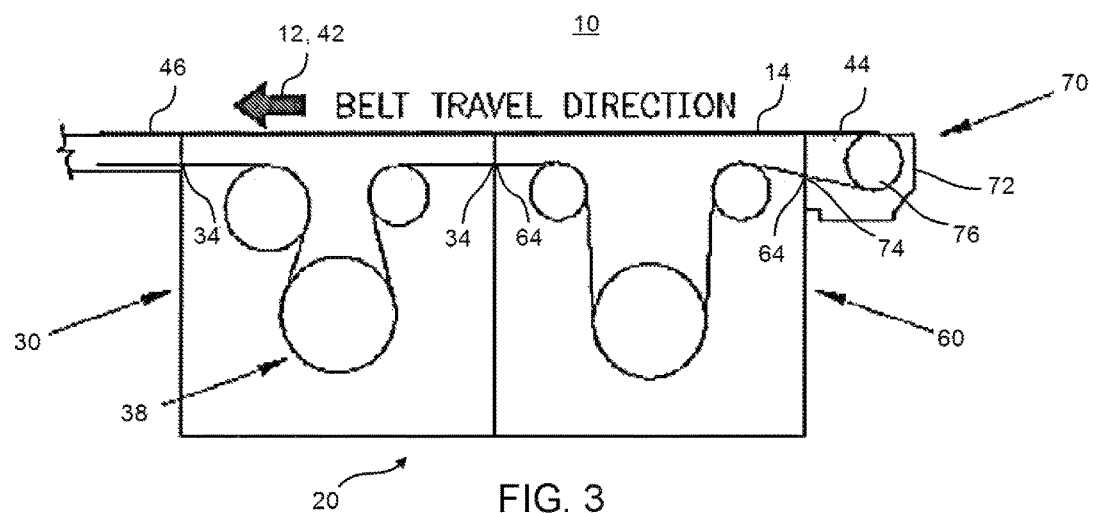
FIG. 3 is a schematic diagram of another exemplary configuration of a conveyor system for advancing an item relative to a transport axis as disclosed herein.

In further exemplary aspects, the conveyor movement pathway 42 can have opposing input and output ends 44, 46 that can be spaced apart relative to the transport axis 12. As shown in FIGS. 2 and 3, the drive assembly 20 of the conveyor system 10 can further comprise at least one terminal module 70. In these aspects, each terminal module 70 can have a housing 72 and a pulley 76 positioned within the housing 72. It is contemplated that the pulley 76 of each terminal module 70 can be configured to engage the conveyor belt 14.

In some exemplary aspects, a terminal module 70 can be positioned at the input end 44 of the conveyor movement pathway 42. Additionally, or alternatively, in other aspects, a terminal module 70 can be positioned at the output end 46 of the conveyor movement pathway 42. In these aspects, it is contemplated that the housing 72 of each terminal module 70 can be selectively connectable to the housing 32 of a drive module 30 or a take-up module 60 of the modular drive assembly 20.

Optionally, in one exemplary aspect and with reference to FIG. 2, the at least one terminal module 70 can comprise a first terminal module 70. In this aspect, the housing 72 of the first terminal module 70 can be connected to the housing 32 of a drive module 30 of the modular drive assembly 20. In a further aspect, the housing 72 of the first terminal module 70 can define at least one opening 74 that can receive portions of the conveyor belt 14 that extend between the pulley 76 of the first terminal module 70 and the pulley assembly 36 of the drive module 30 to which the first terminal module 70 can be connected. In still a further aspect, the first terminal module 70 can be positioned at the output end 46 of the conveyor movement pathway 42. In another aspect, as shown in FIG. 2, the pulley 76 of the first terminal module 70 can direct a downturn of the conveyor belt 14.

Optionally, in another aspect and with reference to FIG. 3, the at least one terminal module 70 can comprise a first terminal module 70. In this aspect, the housing 72 of the first terminal module 70 can be connected to the housing 62 of a take-up module 60 of the modular drive assembly 20. In a further aspect, the housing 72 of the first terminal module 70 can define at least one opening 74 that can receive portions of the conveyor belt 14 that extend between the pulley 76 of the first terminal module 70 and the pulley assembly 66 of the take-up module 60 to which the first terminal module 70 can be connected. In still a further aspect, the first terminal module 70 can be positioned at the input end 44 of the conveyor movement pathway 42. In another aspect, as shown in FIG. 3, the pulley 76 of the first terminal module 70 can direct an upturn of the conveyor belt 14.

Figure 4:
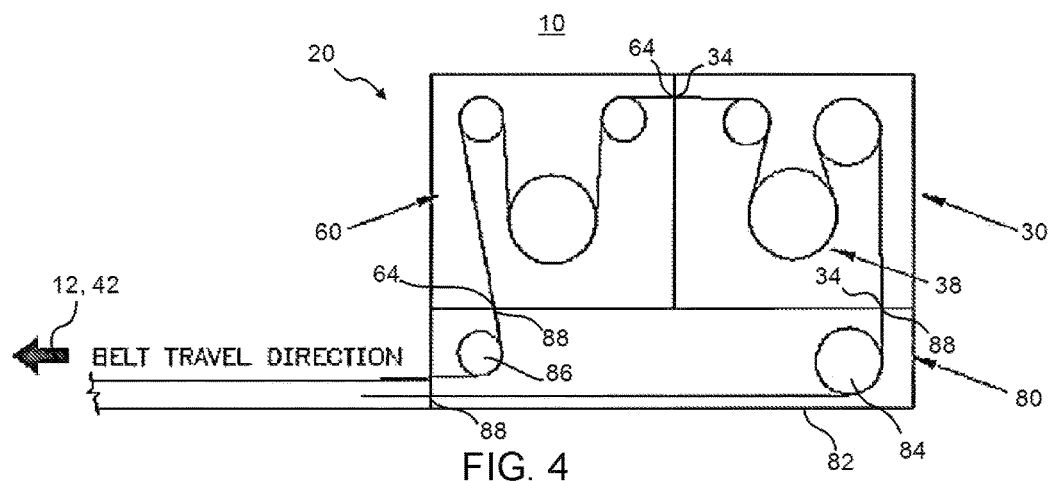
FIG. 4 is a schematic diagram of another exemplary configuration of a conveyor system for advancing an item relative to a transport axis as disclosed herein.

In other exemplary aspects and with reference to FIG. 4, it is contemplated that the conveyor system 10 can further comprise an upturn module 80. In these aspects, the upturn module 80 can comprise a housing 82 and first and second pulleys 84, 86 positioned within the housing 82. In further aspects, the housing 82 of the upturn module 80 can be positioned beneath the housings 62, 32 of the first take-up module 60 and the first drive module 30. In still further aspects, the first pulley 84 of the upturn module 80 can be configured to direct the conveyor belt 14 toward the pulley assembly 36 of the first drive module 30. In a further aspect, the pulley assembly 36 of the first drive module 30 can be configured to direct the conveyor belt 14 toward the pulley assembly 66 of the first take-up module 60. In another aspect, the pulley assembly 66 of the first take-up module 60 can be configured to direct the conveyor belt 14 toward the second pulley 86 of the upturn module 80. In these aspects, as shown in FIG. 4, it is contemplated that the first and second pulleys 84, 86 of the upturn module 80 and the pulley assemblies 66, 36 of the first take-up module 60 and the first drive module 30 can cooperate to effect an upturn of the conveyor belt 14.

In a further aspect, the housing 82 of the upturn module 80 can define at least one opening 88 that can receive portions of the conveyor belt 14 that extend (a) between the first pulley 84 of the upturn module 80 and the pulley assembly 36 of the drive module 30 to which the upturn module 80 can be connected or (b) between the pulley assembly 66 of the take-up module 60 to which the upturn module 80 can be connected and the second pulley 86 of the upturn module. In this aspect, it is further contemplated that the drive module 30 and the take-up module 60 can comprise openings 34, 64 that are positioned in alignment with respective openings 88 of the upturn module 80 and configured to receive corresponding portions of the conveyor belt 14.

In exemplary aspects, it is contemplated that each of the modules 30, 60, 70, 80 disclosed herein can have respective side covers that can be selectively removed to provide access to the pulleys and other components within each module. Optionally, in these aspects, it is contemplated that each module can have two side covers that are spaced apart relative to an axis that is perpendicular or substantially perpendicular to the transport axis 12. In further exemplary aspects, it is contemplated that each module can have fixed support walls extending between the side covers, with the fixed support walls optionally defining openings as disclosed herein.

In further exemplary aspects, the motorized drive pulley 38 of each drive module 30 can be selectively removable and replaceable. In these aspects, each drive module 30 can comprise a drive pulley removal apparatus 48 that can be detachably secured within the housing 32 of the drive module 30. In these aspects, the drive pulley removal apparatus 48 can facilitate the removal and replacement of the motorized drive pulley 38 without needing to "break" the conveyor belt 14, as further described herein.

Figure 6A:
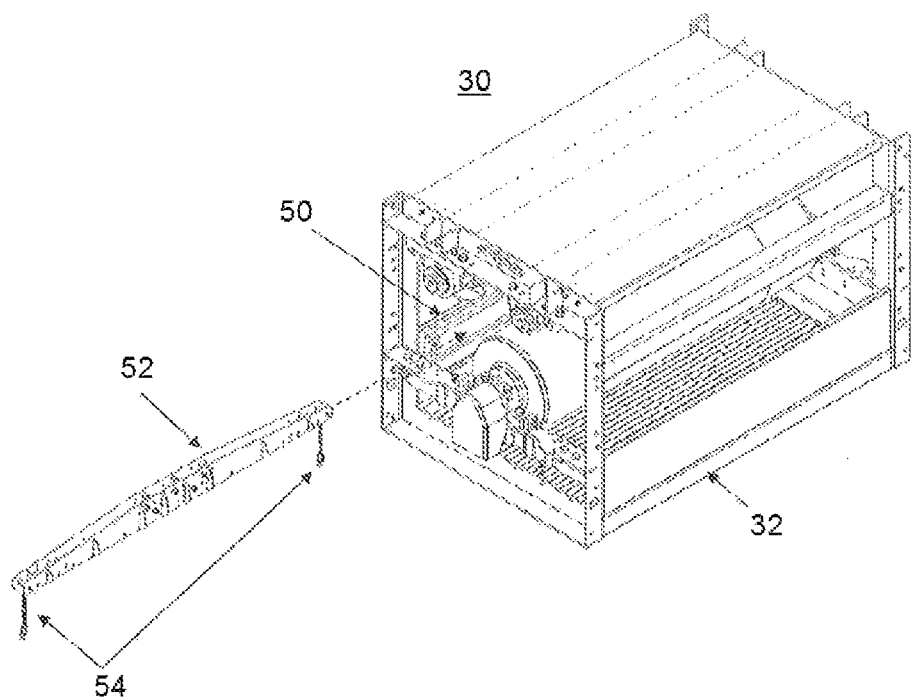
FIG. 6A is a perspective view of the exemplary drive module of FIG. 5B, showing a carriage unit positioned outside the housing of the drive module for coupling with the support beam, as disclosed herein.
Figure 6B:
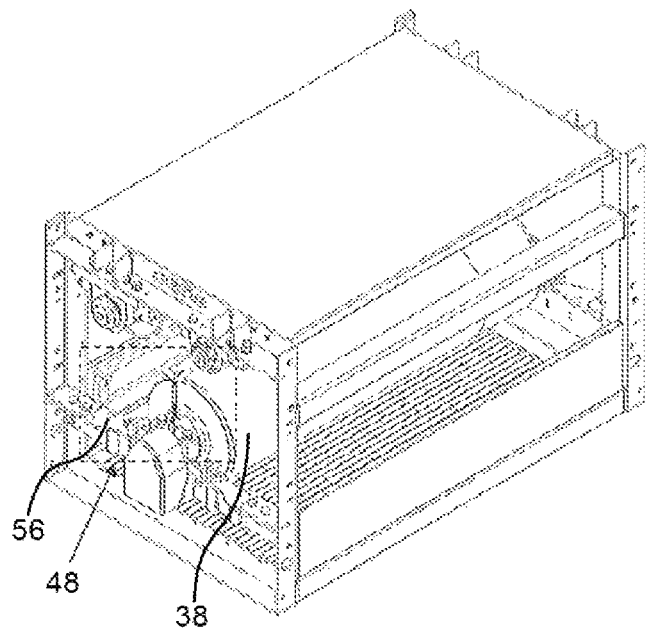
FIG. 6B is a perspective view of the exemplary drive module of FIG. 6A, showing the carriage unit slidably coupled to the support beam as disclosed herein.
Figure 6C:
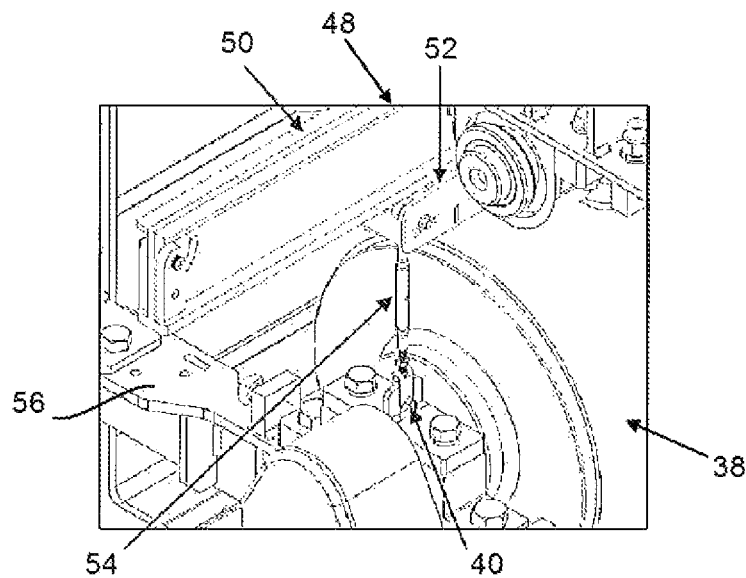
FIG. 6C is an enlarged view of the boxed portion identified in FIG. 6B and shows the carriage unit engaging a mounting bracket of a drive pulley removal apparatus secured within the housing of the drive module as disclosed herein.
Figure 7:
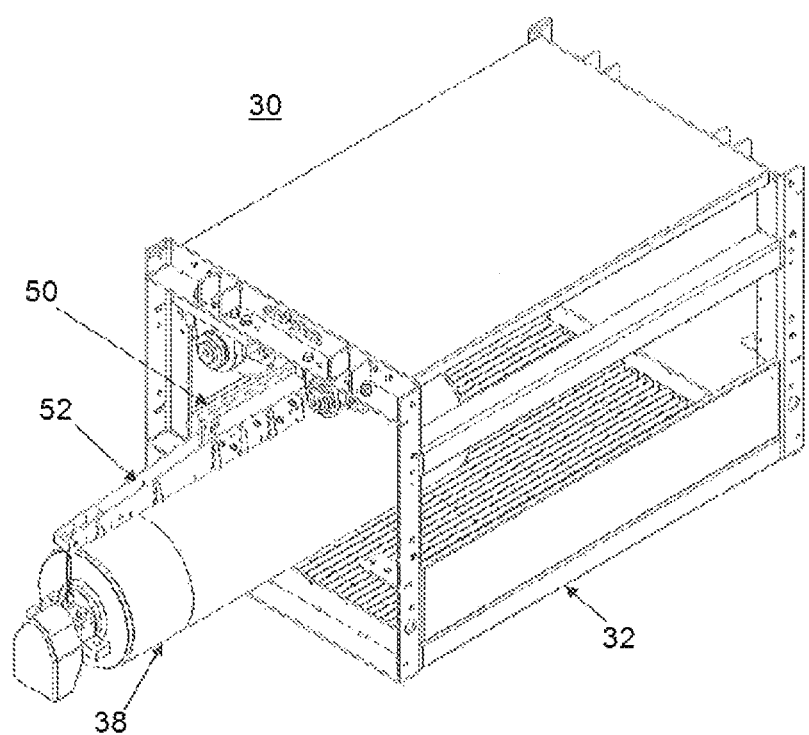
FIG. 7 is a perspective view of the exemplary drive module of FIGS. 6B-6C, showing the drive pulley removal apparatus detached from the housing of the drive module to remove a drive pulley from the housing as disclosed herein.

In another aspect, as shown in FIGS. 6B-6C, the motorized drive pulley 38 of each drive module 30 can comprise at least one mounting bracket 40 for detachably securing the motorized drive pulley 38 to the housing 32 of the drive module 30. Following detachment of the motorized drive pulley 38 from the housing 32 of the drive module 30, the drive pulley removal apparatus 48 can be configured to engage the at least one mounting bracket 40 of the motorized drive pulley 38 and effect movement of the motorized drive pulley 38 from a stowed position within the housing 32 of the drive module 30 to an accessible position in which at least a portion of the motorized drive pulley 38 is outside the housing 32 of the drive module 30, as shown in FIG. 7. It is contemplated that the mounting bracket 40 can serve as a lifting lug for lifting the drive pulley 38 using the drive pulley removal apparatus 48. It is further contemplated that the mounting brackets 40 can provide consistent locations within the module 30 for establishing engagement between the drive pulley removal apparatus 48 and the drive pulley 38. Optionally, in exemplary aspects, it is contemplated that the drive pulley can comprise two opposed mounting brackets (positioned on opposite ends of the drive pulley) that are configured to engage corresponding portions of the drive pulley removal apparatus 48.

In still further exemplary aspects, as shown in FIGS. 5A-6C, the drive pulley removal apparatus 48 of each drive module 30 can comprise a support beam 50 that can be secured to the housing 32 of the drive module 30. In further exemplary aspects, the drive pulley removal apparatus 48 of each drive module 30 can comprise a carriage unit 52 that can be configured to engage the at least one mounting bracket 40 of the motorized drive pulley 38. In these aspects, as shown in FIGS. 6A-6C, the carriage unit 52 can be slidably coupled to the support beam 50 to permit axial translation of the carriage unit 52 relative to the support beam 50. In further aspects, as shown in FIG. 6C, the carriage unit 52 can comprise at least one fastener or adjustable linkage (e.g., lifting device or turnbuckle 54), and each fastener or adjustable linkage (e.g., lifting device or turnbuckle 54) can be configured to engage and permit lifting of a respective mounting bracket 40 of the motorized drive pulley 38 of the drive module 30. Optionally, in exemplary aspects, the at least one fastener or adjustable linkage can comprise opposed fasteners or adjustable linkages that are positioned on opposing ends of the support beam 50 and configured to engage corresponding opposed mounting brackets 40 of the drive pulley 38.

As further described herein, in exemplary aspects, the drive module 30 for the conveyor system 10 can comprise a housing 32, a pulley assembly 36, and a drive pulley removal apparatus 48. In these aspects, the pulley assembly 36 can be positioned within the housing 32 and can comprise a motorized drive pulley 38. In further aspects, the motorized drive pulley 38 can comprise at least one mounting bracket 40 for detachably securing the motorized drive pulley 38 to the housing 32. In still further aspects, the motorized drive pulley 38 of each drive module 30 can be selectively removable and replaceable. In these aspects, the drive pulley removal apparatus 48 can be detachably secured within the housing 32. Following detachment of the motorized drive pulley 38 from the housing 32, it is contemplated that the drive pulley removal apparatus 48 can be configured to engage the at least one mounting bracket 40 of the motorized drive pulley 38 and effect movement of the motorized drive pulley 38 from a stowed position within the housing 32 of the drive module 30 to an accessible position in which at least a portion of the motorized drive pulley 38 is outside the housing 32 of the drive module 30. As shown in FIGS. 5A-6C, movement of the drive pulley 38 from the stowed position to the accessible position can occur relative to a movement pathway that is perpendicular or substantially perpendicular to the transport axis 12. In further aspects, the drive pulley removal apparatus 48 can comprise a support beam 50 that can be secured to the housing 32 of the drive module 30. In further aspects, the drive pulley removal apparatus 48 can comprise a carriage unit 52 that can be configured to engage the at least one mounting bracket 40 of the motorized drive pulley 38. In these aspects, the carriage unit 52 can be slidably coupled to the support beam 50 to permit axial translation of carriage unit 52 relative to the support beam 50 (for example, relative to an axis that is perpendicular or substantially perpendicular to the transport axis 12).

Figure 5A:
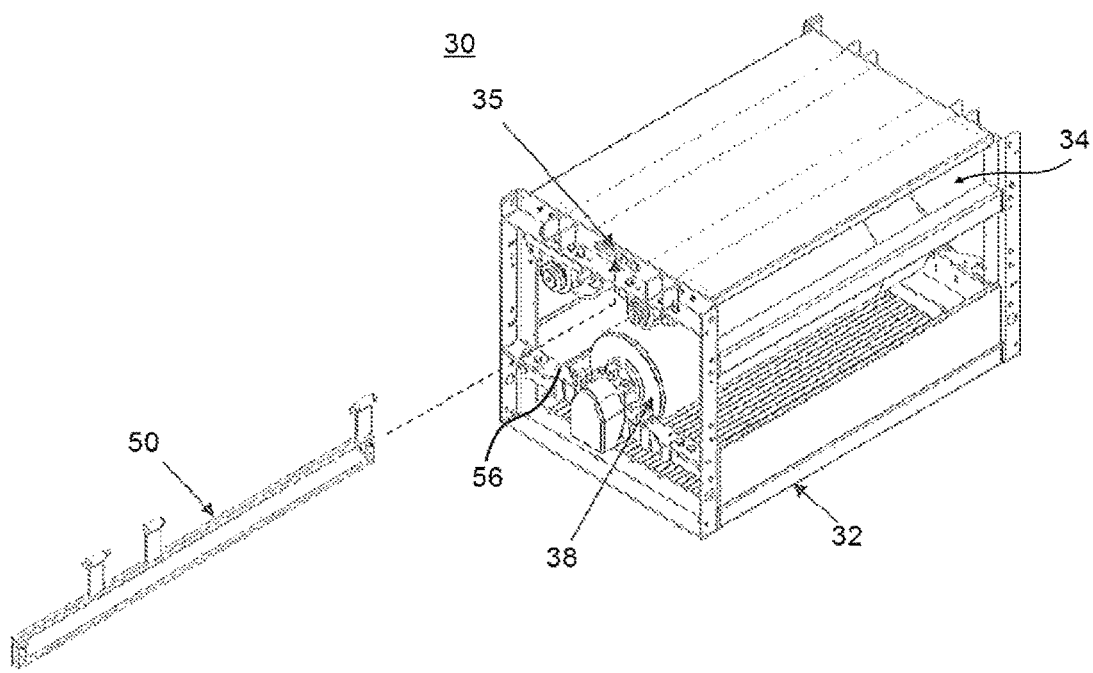
FIG. 5A is a perspective view of an exemplary drive module having a support beam positioned outside the housing of the drive module for engagement with the housing, as disclosed herein.
Figure 5B:
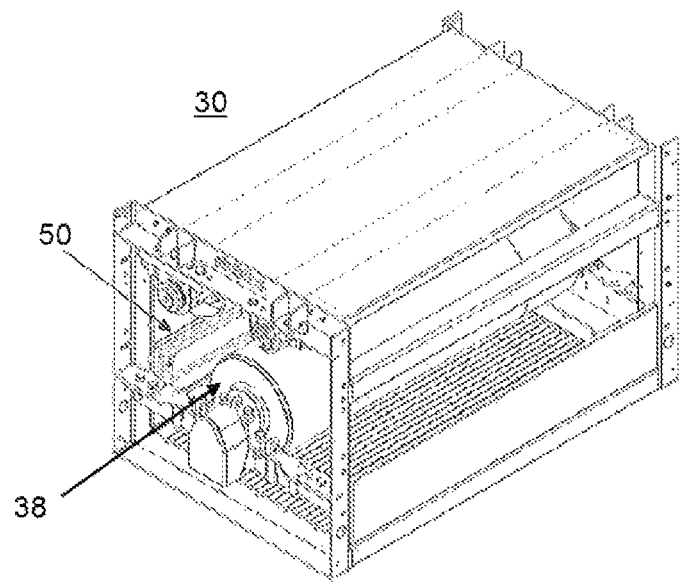
FIG. 5B is a perspective view of the exemplary drive module of FIG. 5A, showing the support beam secured to the housing of the drive module as disclosed herein.

To assemble the drive pulley removal apparatus 48 to the drive module 30, the side covers for the drive module 30 can be removed to expose the inner components as disclosed herein. Then, the support beam 50 can be placed inside the drive module 30 and bolted to mounting points 35, as shown in FIGS. 5A-5B. Subsequently, the carriage unit 52 can be inserted onto the support beam 50 and the turnbuckle attachments 54 can be connected to the mounting brackets 40 of the motorized drive pulley 38, as shown in FIGS. 6A-6C. Once the turnbuckles 54 are tightened and the mounting bracket 40 is unbolted from a side support frame 56, the side support frame can be removed from the drive module 30 to provide open access to the motorized drive pulley 38. With the motorized drive pulley 38 suspended freely by the carriage unit 52 and fasteners (e.g., turnbuckles 54), the motorized drive pulley 38 can be laterally moved out of the drive module 30 from the stowed position to the accessible position, as shown in FIG. 7. From this position, the motorized drive pulley 38 can be easily accessed by external devices needed to support the drive pulley, such as, for example and without limitation, rigging devices. As would be appreciated by one of skill in the art, the process can be reversed for re-installation purposes.

As shown in FIGS. 9A-9B, the housing 32 of each drive module 30 can define a plurality of mounting points 35 in an upper portion of the housing to permit mounting of the drive pulley removal apparatus 48 to the housing 32 in an orientation (e.g., a vertical orientation) that permits engagement between the drive pulley removal apparatus 48 and the mounting brackets 40 of the motorized drive pulley 38. For example, when the drive module 30 is positioned in a flat or horizontal orientation as shown in FIG. 9A, the drive pulley removal apparatus 48 can be mounted to the housing at a first mounting point 35 (e.g. a center mounting point) that is positioned in vertical alignment with the at least one mounting bracket 40. When the drive module 30 is positioned in an inclined orientation as shown in FIG. 9B, the drive pulley removal apparatus 48 can be mounted to the housing at a second mounting point 35 different from the first mounting point that is positioned in vertical alignment with the at least one mounting bracket 40 with the module in the inclined orientation. Thus, in any configuration of the module, the drive pulley removal apparatus 48 can achieve a vertical orientation that permits removal of the drive pulley 38.

In use, it is contemplated that a conveyor drive assembly, or more particularly a modular drive assembly 20, can be selectively positioned in a first configuration to define a first conveyor movement pathway. The conveyor drive assembly 20 can comprise a plurality of modules 30, 60, 70, 80, with each module of the conveyor drive assembly 20 having a housing and a pulley assembly that can be positioned within the housing. The housings of the plurality of modules can be selectively positioned relative to the transport axis 12 to define the first conveyor movement pathway. A first item can be positioned on a conveyor belt 14 that is positioned in engagement with the pulley assembly of each module of the conveyor drive assembly 20. It is contemplated that the movement of the conveyor belt 14 can be driven relative to the first conveyor movement pathway. If desired, the conveyor belt 14 can be disengaged from the pulley assembly of at least one module of the conveyor drive assembly 20. Optionally, the position or orientation of the housing of at least one module of the conveyor drive assembly 20 can be selectively adjusted to define a second conveyor movement pathway that can be different from the first conveyor movement pathway (for example, different in shape, pattern, direction, angular orientation, or combinations thereof). Once the housing is positioned as desired, the conveyor belt 14 can be further positioned in engagement with the pulley assemblies of the plurality of modules of the conveyor drive assembly 20. A second item can be positioned on the conveyor belt 14, and movement of the conveyor belt 14 can be driven relative to the second conveyor movement pathway.

In exemplary aspects, it is contemplated that the plurality of modules can comprise a drive module 30, and the pulley assembly 36 of the drive module 30 can comprise a motorized drive pulley 38. In use, a conveyor drive assembly 20 can be positioned in a first configuration to define the first conveyor movement pathway, as described herein. The housings of the plurality of modules can be selectively positioned relative to the transport axis 12 to define the first conveyor movement pathway. Optionally, a conveyor belt 14 can be positioned in engagement with the pulley assemblies of the plurality of modules of the conveyor drive assembly 20 such that the conveyor belt 14 forms a closed loop. It is contemplated that the motorized drive pulley 38 of the drive module 30 can be selectively removed and replaced without breaking the closed loop formed by the conveyor belt 14. In further exemplary aspects, the drive module 30 can comprise a drive pulley removal apparatus 48 that can be detachably secured within the housing 32 of the drive module 30. In these aspects, the motorized drive pulley 38 can be selectively removed and replaced by detaching the motorized drive pulley 38 from the housing 32, engaging the motorized drive pulley 38 with a drive pulley removal apparatus 48 secured to the housing 32 of the drive module 30, and using the drive pulley removal apparatus 48 to move the motorized drive pulley 38 from a stowed position within the housing 32 of the drive module 30 to an accessible position in which at least a portion of the motorized drive pulley 38 is outside the housing 32 of the drive module 30.

It is contemplated that certain implementations of the systems and methods disclosed herein can provide one or more advantages. For example, at least four basic drive configurations can be produced from the disclosed modules, which can provide benefits through standardization of parts, simplification of the conveyor system design process, and production cost benefits. The modular conveyor system disclosed herein can also provide flexible conveyor configurations and allow easy reuse if conveyors are dismantled or reconfigured. It is further contemplated that the disclosed systems and methods can allow for conveyor drive horsepower or speed changes to be made without having to make major modifications to the drive module because, for example and without limitation, it is possible to only replace the motorized drive pulley 38 and its mounting brackets 40. It is further contemplated that the disclosed systems and methods can allow for the maximum benefits from a motorized drive pulley 38 to be realized, including, for example and without limitation: a compact design; full-enclosure of the modules to prevent debris from entering the modules and to dampen the noise output levels; low maintenance through elimination of common points of failure such as drive belts (e.g., HTD Belts), drive chains, and Motor/Reducer Couplings; and increased safety as compared to a conventional drive due to the elimination of internal drive module components that require maintenance personnel to be inside the drive module 30 to adjust. As further described herein, it is also contemplated that the drive pulley removal apparatus 48 can simplify the task of installing and removing a motorized drive pulley 38, which helps to reduce maintenance downtime.

Exemplary Aspects

In view of the described devices, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A conveyor system for advancing an item relative to a transport axis, the conveyor system comprising: a conveyor belt; and a modular drive assembly comprising: at least one drive module, each drive module having a housing and a pulley assembly positioned within the housing, wherein the pulley assembly of each drive module is configured to engage the conveyor belt and drive movement of the conveyor belt along a conveyor movement pathway; and at least one take-up module, each take-up module having a housing and a pulley assembly positioned within the housing, wherein the pulley assembly of each take-up module is configured to engage the conveyor belt and provide tension to the conveyor belt as the conveyor belt moves along the conveyor movement pathway, wherein respective positions of the housings of the at least one drive module and the at least one take-up module relative to the transport axis are selectively adjustable to modify the conveyor movement pathway.

Aspect 2: The conveyor system of aspect 1, wherein the at least one drive module comprises a single drive module.

Aspect 3: The conveyor system of aspect 1 or aspect 2, wherein the at least one take-up module comprises a single take-up module.

Aspect 4: The conveyor system of any one of the preceding aspects, wherein the housing of a first drive module of the at least one drive module is positioned adjacent the housing of a first take-up module of the at least one take-up module, and wherein the housings of the first drive module and the first take-up module define respective openings that receive portions of the conveyor belt that extend between the pulley assembly of the first drive module and the pulley assembly of the first take-up module.

Aspect 5: The conveyor system of any one of the preceding aspects, wherein the conveyor movement pathway has opposing input and output ends that are spaced apart relative to the transport axis, wherein the drive assembly of the conveyor system further comprises at least one terminal module, each terminal module having a housing and a pulley positioned within the housing, wherein the pulley of each terminal module is configured to engage the conveyor belt, wherein each terminal module is positioned at either the input end or the output end of the conveyor movement pathway, and wherein the housing of each terminal module is selectively connectable to the housing of a drive module or a take-up module of the modular drive assembly.

Aspect 6: The conveyor system of aspect 5, wherein the at least one terminal module comprises a first terminal module, wherein the housing of the first terminal module is connected to the housing of a drive module of the modular drive assembly, and wherein the housing of the first terminal module defines at least one opening that receives portions of the conveyor belt that extend between the pulley of the first terminal module and the pulley assembly of the drive module to which the first terminal module is connected.

Aspect 7: The conveyor system of aspect 6, wherein the first terminal module is positioned at the output end of the conveyor movement pathway.

Aspect 8: The conveyor system of aspect 7, wherein the pulley of the first terminal module directs a downturn of the conveyor belt.

Aspect 9: The conveyor system of any one of aspects 1-8, wherein the at least one terminal module comprises a first terminal module, wherein the housing of the first terminal module is connected to the housing of a take-up module of the modular drive assembly, and wherein the housing of the first terminal module defines at least one opening that receives portions of the conveyor belt that extend between the pulley of the first terminal module and the pulley assembly of the take-up module to which the first terminal module is connected.

Aspect 10: The conveyor system of aspect 9, wherein the first terminal module is positioned at the input end of the conveyor movement pathway.

Aspect 11: The conveyor system of aspect 10, wherein the pulley of the first terminal module directs an upturn of the conveyor belt.

Aspect 12: The conveyor system of any one of aspects 4-11, further comprising an upturn module having a housing and first and second pulleys positioned within the housing, wherein the housing of the upturn module is positioned beneath the housings of the first take-up module and the first drive module, wherein the first pulley of the upturn module is configured to direct the conveyor belt toward the pulley assembly of the first drive module, wherein the pulley assembly of the first drive module is configured to direct the conveyor belt toward the pulley assembly of the first take-up module, wherein the pulley assembly of the first take-up module is configured to direct the conveyor belt toward the second pulley of the upturn module, and wherein the first and second pulleys of the upturn module and the pulley assemblies of the first take-up module and the first drive module cooperate to effect an upturn of the conveyor belt.

Aspect 13: The conveyor system of any of the preceding aspects, wherein the pulley assembly of each drive module comprises a motorized drive pulley.

Aspect 14: The conveyor system of aspect 13, wherein the motorized drive pulley of each drive module is selectively removable and replaceable.

Aspect 15: The conveyor system of aspect 14, wherein each drive module comprises a drive pulley removal apparatus detachably secured within the housing of the drive module.

Aspect 16: The conveyor system of aspect 15, wherein the motorized drive pulley of each drive module comprises at least one mounting bracket for detachably securing the motorized drive pulley to the housing of the drive module, and wherein, following detachment of motorized drive pulley from the housing of the drive module, the drive pulley removal apparatus is configured to engage the at least one mounting bracket of the motorized drive pulley and effect movement of the motorized drive pulley from a stowed position within the housing of the drive module to an accessible position in which at least a portion of the motorized drive pulley is outside the housing of the drive module.

Aspect 17: The conveyor system of aspect 16, wherein the drive pulley removal apparatus of each drive module comprises: a support beam secured to the housing of the drive module; and a carriage unit configured to engage the at least one mounting bracket of the motorized drive pulley, wherein the carriage unit is slidably coupled to the support beam to permit axial translation of carriage unit relative to the support beam.

Aspect 18: The conveyor system of aspect 17, wherein the carriage unit comprises at least one turnbuckle, wherein each turnbuckle is configured to engage a respective mounting bracket of the motorized drive pulley of the drive module.

Aspect 19: A drive module for a conveyor system, the drive module comprising: a housing; a pulley assembly positioned within the housing and comprising a motorized drive pulley, the motorized drive pulley comprising at least one mounting bracket for detachably securing the motorized drive pulley to the housing, wherein the motorized drive pulley of each drive module is selectively removable and replaceable; and a drive pulley removal apparatus detachably secured within the housing, wherein, following detachment of motorized drive pulley from the housing, the drive pulley removal apparatus is configured to engage the at least one mounting bracket of the motorized drive pulley and effect movement of the motorized drive pulley from a stowed position within the housing of the drive module to an accessible position in which at least a portion of the motorized drive pulley is outside the housing of the drive module.

Aspect 20: The drive module of aspect 19, wherein the drive pulley removal apparatus comprises: a support beam secured to the housing of the drive module; and a carriage unit configured to engage the at least one mounting bracket of the motorized drive pulley, wherein the carriage unit is slidably coupled to the support beam to permit axial translation of carriage unit relative to the support beam.

Aspect 21: A method of driving a conveyor to advance an item relative to a transport axis, the method comprising: selectively positioning a conveyor drive assembly in a first configuration to define a first conveyor movement pathway, wherein the conveyor drive assembly comprises a plurality of modules, each module of the conveyor drive assembly having a housing and a pulley assembly positioned within the housing, and wherein the housings of the plurality of modules are selectively positioned relative to the transport axis to define the first conveyor movement pathway; positioning a first item on a conveyor belt positioned in engagement with the pulley assembly of each module of the conveyor drive assembly; driving movement of the conveyor belt relative to the first conveyor movement pathway; disengaging the conveyor belt from the pulley assembly of at least one module of the conveyor drive assembly; selectively adjusting the positioning of the housing of at least one module of the conveyor drive assembly to define a second conveyor movement pathway that is different from the first conveyor movement pathway; positioning the conveyor belt in engagement with the pulley assemblies of the plurality of modules of the conveyor drive assembly; positioning a second item on the conveyor belt; and driving movement of the conveyor belt relative to the second conveyor movement pathway.

Aspect 22: A method of driving a conveyor to advance an item relative to a transport axis, the method comprising: selectively positioning a conveyor drive assembly in a first configuration to define a first conveyor movement pathway, wherein the conveyor drive assembly comprises a plurality of modules, each module of the conveyor drive assembly having a housing and a pulley assembly positioned within the housing, wherein the plurality of modules comprises a drive module, wherein the pulley assembly of the drive module comprises a motorized drive pulley, wherein the housings of the plurality of modules are selectively positioned relative to the transport axis to define the first conveyor movement pathway; positioning a conveyor belt in engagement with the pulley assemblies of the plurality of modules of the conveyor drive assembly such that the conveyor belt forms a closed loop; and selectively removing and replacing the motorized drive pulley of the drive module without breaking the closed loop formed by the conveyor belt.

Aspect 23: The method of aspect 22, wherein the drive module comprises a drive pulley removal apparatus detachably secured within the housing of the drive module, and wherein selectively removing and replacing the motorized drive pulley comprises: detaching the motorized drive pulley from the housing; engaging the motorized drive pulley with a drive pulley removal apparatus secured to the housing of the drive module; and using the drive pulley removal apparatus to move the motorized drive pulley from a stowed position within the housing of the drive module to an accessible position in which at least a portion of the motorized drive pulley is outside the housing of the drive module.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, certain changes and modifications may be practiced within the scope of the appended claims.

What is claimed is:

1. A conveyor system for advancing an item relative to a transport axis, the conveyor system comprising:
 a conveyor belt; and
 a modular drive assembly comprising:
  at least one drive module, each drive module having a housing and a pulley assembly positioned within the housing, wherein the pulley assembly of each drive module is configured to engage the conveyor belt and drive movement of the conveyor belt along a conveyor movement pathway; and
  at least one take-up module, each take-up module having a housing and a pulley assembly positioned within the housing, wherein the pulley assembly of each take-up module is configured to engage the conveyor belt and provide tension to the conveyor belt as the conveyor belt moves along the conveyor movement pathway,
 wherein respective positions of the housings of the at least one drive module and the at least one take-up module relative to the transport axis are selectively adjustable to modify the conveyor movement pathway.

2. The conveyor system of claim 1, wherein the at least one drive module comprises a single drive module.

3. The conveyor system of claim 1, wherein the at least one take-up module comprises a single take-up module.

4. The conveyor system of claim 1, wherein the housing of a first drive module of the at least one drive module is positioned adjacent the housing of a first take-up module of the at least one take-up module, and wherein the housings of the first drive module and the first take-up module define respective openings that receive portions of the conveyor belt that extend between the pulley assembly of the first drive module and the pulley assembly of the first take-up module.

5. The conveyor system of claim 4, further comprising an upturn module having a housing and first and second pulleys positioned within the housing, wherein the housing of the upturn module is positioned beneath the housings of the first take-up module and the first drive module, wherein the first pulley of the upturn module is configured to direct the conveyor belt toward the pulley assembly of the first drive module, wherein the pulley assembly of the first drive module is configured to direct the conveyor belt toward the pulley assembly of the first take-up module, wherein the pulley assembly of the first take-up module is configured to direct the conveyor belt toward the second pulley of the upturn module, and wherein the first and second pulleys of the upturn module and the pulley assemblies of the first take-up module and the first drive module cooperate to effect an upturn of the conveyor belt.

6. The conveyor system of claim 1, wherein the conveyor movement pathway has opposing input and output ends that are spaced apart relative to the transport axis, wherein the drive assembly of the conveyor system further comprises at least one terminal module, each terminal module having a housing and a pulley positioned within the housing, wherein the pulley of each terminal module is configured to engage the conveyor belt, wherein each terminal module is positioned at either the input end or the output end of the conveyor movement pathway, and wherein the housing of each terminal module is selectively connectable to the housing of a drive module or a take-up module of the modular drive assembly.

7. The conveyor system of claim 6, wherein the at least one terminal module comprises a first terminal module, wherein the housing of the first terminal module is connected to the housing of a drive module of the modular drive assembly, and wherein the housing of the first terminal module defines at least one opening that receives portions of the conveyor belt that extend between the pulley of the first terminal module and the pulley assembly of the drive module to which the first terminal module is connected.

8. The conveyor system of claim 7, wherein the first terminal module is positioned at the output end of the conveyor movement pathway.

9. The conveyor system of claim 8, wherein the pulley of the first terminal module directs a downturn of the conveyor belt.

10. The conveyor system of claim 6, wherein the at least one terminal module comprises a first terminal module, wherein the housing of the first terminal module is connected to the housing of a take-up module of the modular drive assembly, and wherein the housing of the first terminal module defines at least one opening that receives portions of the conveyor belt that extend between the pulley of the first terminal module and the pulley assembly of the take-up module to which the first terminal module is connected.

11. The conveyor system of claim 10, wherein the first terminal module is positioned at the input end of the conveyor movement pathway.

12. The conveyor system of claim 11, wherein the pulley of the first terminal module directs an upturn of the conveyor belt.

13. The conveyor system of claim 1, wherein the pulley assembly of each drive module comprises a motorized drive pulley.

14. The conveyor system of claim 13, wherein the motorized drive pulley of each drive module is selectively removable and replaceable.

15. The conveyor system of claim 14, wherein each drive module comprises a drive pulley removal apparatus detachably secured within the housing of the drive module.

16. The conveyor system of claim 15, wherein the motorized drive pulley of each drive module comprises at least one mounting bracket for detachably securing the motorized drive pulley to the housing of the drive module, and wherein, following detachment of motorized drive pulley from the housing of the drive module, the drive pulley removal apparatus is configured to engage the at least one mounting bracket of the motorized drive pulley and effect movement of the motorized drive pulley from a stowed position within the housing of the drive module to an accessible position in which at least a portion of the motorized drive pulley is outside the housing of the drive module.

17. The conveyor system of claim 16, wherein the drive pulley removal apparatus of each drive module comprises:
 a support beam secured to the housing of the drive module; and
 a carriage unit configured to engage the at least one mounting bracket of the motorized drive pulley, wherein the carriage unit is slidably coupled to the support beam to permit axial translation of the carriage unit relative to the support beam.

18. The conveyor system of claim 17, wherein the carriage unit comprises at least one turnbuckle, wherein each turnbuckle is configured to engage a respective mounting bracket of the motorized drive pulley of the drive module.

* * * * *